(12) United States Patent
Miedema

(10) Patent No.: US 10,118,346 B2
(45) Date of Patent: Nov. 6, 2018

(54) METHOD FOR PRINTING 3D STRUCTURES

(71) Applicant: OCE-TECHNOLOGIES B.V., Venlo (NL)

(72) Inventor: Mark Miedema, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 241 days.

(21) Appl. No.: 15/058,784

(22) Filed: Mar. 2, 2016

(65) Prior Publication Data
US 2016/0263839 A1 Sep. 15, 2016

(30) Foreign Application Priority Data
Mar. 10, 2015 (EP) .................................... 15158354

(51) Int. Cl.
*B29C 64/112* (2017.01)
*B33Y 70/00* (2015.01)
*B33Y 10/00* (2015.01)
*B29C 67/00* (2017.01)

(52) U.S. Cl.
CPC ...... *B29C 67/0092* (2013.01); *B29C 67/0059* (2013.01); *B29K 2835/00* (2013.01); *B33Y 10/00* (2014.12); *B33Y 70/00* (2014.12)

(58) Field of Classification Search
CPC ....... B29C 64/40; B29C 64/112; B29C 64/10; B29C 64/124; B29C 64/188; B29C 64/194; B29C 67/0059; B33Y 70/00
See application file for complete search history.

(56) References Cited

U.S. PATENT DOCUMENTS

| 5,503,785 A | * | 4/1996 | Crump | ................... B33Y 10/00 264/308 |
|---|---|---|---|---|
| 2004/0175451 A1 | | 9/2004 | Maekawa et al. | |
| 2005/0053798 A1 | * | 3/2005 | Maekawa | ............. B33Y 40/00 428/542.8 |
| 2008/0233302 A1 | | 9/2008 | Elsner et al. | |
| 2010/0270707 A1 | * | 10/2010 | Priedeman, Jr. | ........ B29C 41/08 264/308 |
| 2015/0028523 A1 | | 1/2015 | Jaker et al. | |

FOREIGN PATENT DOCUMENTS

| EP | 1 239 014 A1 | 9/2002 |
|---|---|---|
| WO | WO 2005/113219 A1 | 12/2005 |

* cited by examiner

*Primary Examiner* — Karuna P Reddy
(74) *Attorney, Agent, or Firm* — Birch, Stewart, Kolasch & Birch, LLP

(57) ABSTRACT

The invention comprises a method for forming a 3D object, wherein the method comprises the step of depositing a support structure. According to the invention, the support structure comprises an organic di-acid having a molecular weight of 300 g/mole or less. The invention further relates to an assembly of a 3D printed object and a support structure.

8 Claims, 4 Drawing Sheets

METHOD FOR PRINTING 3D STRUCTURES

The present invention relates to a method for forming a 3D object. The present invention further relates to an assembly of a 3D printed object and a support structure.

BACKGROUND OF THE INVENTION

Manufacturing of 3D structures using inkjet printing is known in the art. 3D structures may be manufactured by applying a predetermined pattern of droplets onto a supporting medium, the pattern of droplets comprising a plurality of layers of droplets. In this way, 3 dimensional (3D) objects may be built using inkjet technology.

It is further known to use a support structure when printing 3D structures. The support structure may support the 3D structure during manufacturing of the 3D structure, to support the actual 3D structure while it is being built. When manufacturing of the 3D structure is finished, the support structure may be removed, yielding a finished 3D printed product.

To efficiently print 3D structures using a support structure, it is preferred that the support structure is sufficiently strong to efficiently support the 3D structure during its manufacturing. Further, it is preferred that the support structure can be easily removed. In addition, it is preferred that the composition can be easily jetted using a print head. Furthermore, from an environmental point of view, it may be preferred to use a re-usable composition for printing the support structure.

It is therefore an object of the invention to provide a method for forming a 3D object that meets the above requirements.

It is a further object to provide an alternative composition for forming a support structure and a corresponding method for forming a 3D object.

SUMMARY OF THE INVENTION

The object is achieved in a method for forming a 3D object, the method comprising the steps of:
  selectively depositing layers of a building material by ejecting droplets of the building material;
  depositing a support structure by depositing droplets of a support material, wherein the support material comprises an organic di-acid having a molecular weight of 300 g/mole or less.

Printing of 3D objects can be used to manufacture objects. For example, 3D printing may be used for rapid prototyping. 3D printing allows manufacturing 3D objects in a versatile and relatively fast way. The objects may be formed by printing a suitable building material in a predetermined shape. The building material may be e.g. a radiation curable ink or a phase change ink. Further, a radiation curable phase change ink may be used. The building material may comprise additives, such as metal particles, silicon particles and carbon nanotubes.

In the method according to the present invention, in a first step, layers of a building material may be deposited selectively by ejecting droplets of the building material onto a supporting substrate. In inkjet printing, an object is formed by selectively applying droplets onto a medium. When printing a 3D object, the droplets may be applied to form a plurality of layers, the plurality of layers forming a 3-dimensional object. The medium, on which the droplets are applied, may be a recording substrate. The recording substrate may be removed after the 3D object is finished. Alternatively, the printed 3D object may stay connected to the medium. Optionally, an amount of the support material may be applied on the medium before the built material is applied, forming an intermediate support layer in between the medium and the 3D object. This layer may be removed after the 3D object is finished.

The method according to the present invention may further comprise the step of depositing a support structure by depositing droplets of a support material, wherein the support material comprises an organic di-acid having a molecular weight of 300 g/mole or less. The droplets of the support material may be applied in a predetermined pattern, optionally comprising a plurality of layers. The predetermined pattern may be selected such, that the support material supports the built material forming the 3D object. Hence, the support structure may support the 3D object comprising the building material during manufacturing of the 3D object.

The support structure may be applied before the building material is applied. Alternatively, the support structure and the building material may be applied at the same time, for example by using two or more droplet ejecting device, at least one droplet ejecting device configured to eject droplets of the building material and at least one droplet ejecting device being configured to eject droplets of the support material. In a further alternative, the building material may be applied before the support material is applied.

The building material may be different from the support material. This allows selectively removing the support structure after finishing the 3D object, while leaving the 3D object intact.

The support material may comprise an organic di-acid having a molecular weight of 300 g/mole or less. The organic di-acid may be a compound comprising two carboxylic acid functional groups. Organic di-acids having a molecular weight of 300 g/mole or less may be crystalline. The crystalline nature of the organic di-acid may provide the support material with strength, which may allow the support material to efficiently support the building material. Preferably, crystallization of the support material may take place fast, for example within less than 1 second after applying the support material, preferably within less than 0.1 s after applying the support material. Fast crystallization of the support material may prevent mixing of the support structure and the building material during formation of the 3D object.

Preferably, the organic di-acid may have a molecular weight in the range of 100 g/mole-300 g/mole. More preferably, the organic di-acid may have a molecular weight in the range of 110 g/mole-200 g/mole, for example a molecular weight in the range of 120 g/mole-150 g/mole.

Such organic di-acids may be suitably used in a support material for printing a support structure.

In an embodiment, the organic di-acid may be a compound according to formula 1:

$$HOC(O)-(CH_2)_x-C(O)OH \qquad \text{Formula 1}$$

x may be an integer from 1 to 15, preferably from 2 to 10, more preferably from 3 to 5. Examples of organic d-acids according to formula 1 are malonic acid, succinic acid, glutaric acid, adipic acid, pimelic acid, suberic acid, azelaic acid and sebacic acid.

In an embodiment, the method further comprises the step of:
  removing the support structure.

After the support structure and the 3D object have been manufactured, the support structure may no longer be required to stabilize the 3D object and may be removed. Optionally, a finishing step may be performed after the building material has been deposited. For example, if the building material comprising a radiation-curable component, then the 3D object may be irradiated by suitable radiation.

After printing and optionally finishing, the support structure may be removed. The support structure may be removed in a suitable way. For example, the support structure may be removed by washing away using a suitable washing liquid. Alternatively, the support structure may be removed by melting the support structure. Further, the support structure may be removed mechanically.

In an embodiment, the support structure is removed using water.

The support structure comprises an organic di-acid having a molecular weight of 300 g/mole or less. Such di-acids are typically water soluble. Hence, support structures consisting of a support material comprising the di-acid may be water-soluble.

The support structure may be removed using water. For example, the assembly of the printed 3D object and the support structure may be rinsed with an aqueous solution after finishing the 3D object, thereby removing the support structure. The aqueous solution may be at room temperature or alternatively, the aqueous solution may be at a temperature above room temperature. The aqueous solution comprises water. Optionally, the aqueous solution may comprise one or more additional components, such as a co-solvent. Preferably, the aqueous solution is water.

By rinsing with water, the support structure may be efficiently removed. Instead of, or in addition to rinsing the assembly of the 3D object and the support structure with water, the assembly may be submerged in a reservoir comprising an aqueous solution, e.g. water.

In an embodiment, the support material may be recycled. After, the support structure has been removed, the support material may be re-used to print another support structure.

For example, in case the support structure is removed by rinsing with water, then after removal of the support structure, the rinsing solution, comprising the support material and water, may be post-processed. For example, water may be removed from the rinsing solution. Water may be removed e.g. by evaporating the water. Upon removal of water, the support material may be recovered and may be used again as a support material for printing a support structure.

In an embodiment, the support material comprises at least 85 wt % of the organic di-acid, based on the total amount of support material. As discussed above, the organic di-acid may provide the support structure with strong mechanical properties. Furthermore, the organic di-acid may provide the support structure with water-solubility. The higher the amount of the organic di-acid in the support material, the more water-soluble the support structure may be and the stronger the mechanical properties of the support material may be.

The support material may further comprise liquid components that need to be removed after printing. Preferably, the amount of these liquid components in the support material may be as low as possible, because removal of the liquid components may limit the productivity of the printing process. Furthermore, in case the liquid component is an organic solvents, then removal of organic solvent may lead to the formation of vapors, which may be unwanted from a Health, Safety and Environmental point of view.

In a further embodiment, the support material consists essentially of the organic di-acid. The support material may be essentially free of components different from the organic di-acid. The organic di-acid may be solid at room temperature and liquid at an elevated temperature. The organic di-acid may be used as a phase change support material. The organic di-acid may be jetted at elevated temperature by a suitable droplet ejecting device, e.g. an inkjet print head. The organic acid may, at a jetting temperature, have a viscosity that allows the organic di-acid to be jetted neat; i.e. droplets of the organic di-acid may be jetted by a print head, without adding other components to the organic di-acid.

In case the support material consists essentially of the organic di-acid, the rate of crystallization of the di-acid after deposition of the droplets may be increased. The presence of crystals may improve the strength of the supporting material. Therefore, it is beneficial that crystals are formed quickly after depositing the support material.

In an embodiment, the droplets of the support material are deposited by ejected said droplets using a print head, the print head comprising a heated chamber. In the heated chamber, the support material is kept at a temperature in the range of 100° C.-145° C., preferably 105° C.-140° C., more preferably from 110° C.-135° C. If the temperature of the support material is lower than 100° C., then the di-acid may not be in a molten state and hence, it may not be possible to eject droplets of the support material comprising the di-acid.

It is preferred to keep the support material at a temperature of not higher than 145° C., because higher temperatures may result in thermal decomposition of the support material. Furthermore, it is energy efficient to keep the support material at a relatively low temperature. Further, when the support material is kept in the heated chamber at a temperature of not higher than 145° C., the support material may cool down and crystallize relatively fast, which may improve the stability and rigidity of the support structure. Further, if the support material is kept at a relatively low temperature, e.g. a temperature of not more than 145 not higher than 145° C., then a substrate on which a 3D object is formed and/or the building material forming the 3D object may not be damaged.

In an embodiment, the organic di-acid is glutaric acid. The molecular formula of glutaric acid is HOC(O)—(CH$_2$)$_3$—C(O)OH. Glutaric acid is solid at room temperature. The melting point of glutaric acid is about 96° C. Hence, at temperatures above about 96° C., glutaric acid may be in a fluid state. Moreover, in a temperature range of from 110° C.-145° C., the viscosity of glutaric acid is such that the di-acid may be jetted neat using a print head. Hence, no additional components are needed in the support material besides glutaric acid. Glutaric acid is water-soluble. After the 3D object has been formed, the support structure consisting essentially of glutaric acid may be removed by washing the assembly of the 3D object and the support structure with water, yielding the 3D object and an aqueous solution of glutaric acid. The glutaric acid may be recovered from the aqueous glutaric acid solution by removing water from the aqueous glutaric acid. The glutaric acid recovered from the aqueous solution may be recycled and be re-used for printing a support structure.

Glutaric acid is a crystalline component. The crystalline nature of glutaric acid allows the formation of rigid support structures that may efficiently support a 3D object during manufacturing.

In an aspect of the invention, an assembly of a 3D printed object and a support structure is provided, wherein the support structure comprises an organic di-acid having a molecular weight of 300 g/mole or less.

Before the support structure is removed, the support structure may provide support to the 3D printed object; the support structure and the 3D printed object may form an assembly.

BRIEF DESCRIPTION OF THE DRAWINGS

These and further features and advantages of the present invention are explained hereinafter with reference to the accompanying drawings showing non-limiting embodiments and wherein.

In the drawings, same reference numerals refer to same elements.

DETAILED DESCRIPTION OF THE DRAWINGS

Figure 1A:
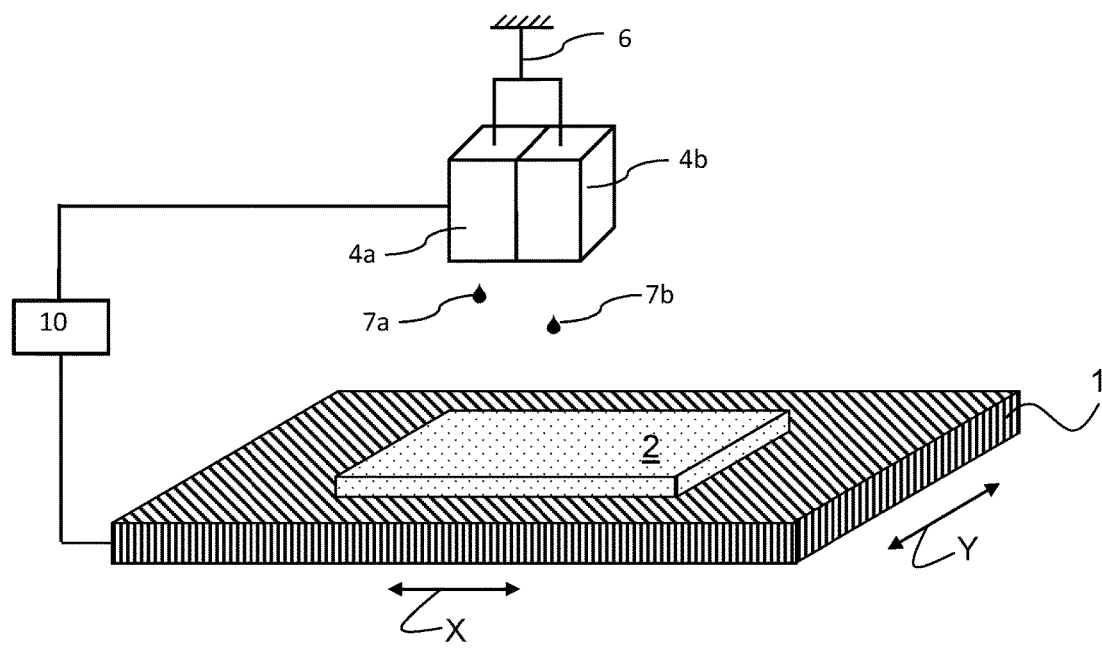
FIG. 1A shows a schematic representation of a ink jet printing device for printing a building material and a support material.
Figure 1B:
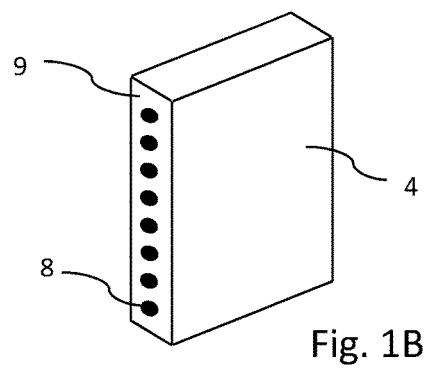
FIG. 1B shows a schematic representation of an inkjet print head.

FIG. 1A shows an ink jet printing assembly 3. The ink jet printing assembly 3 comprises supporting means 1 for supporting a substrate 2. The substrate may also be referred to as recording medium or receiving medium. The supporting means are shown in FIG. 1A as a flat surface, but may also be a rotatable drum, supporting a flexible substrate (e.g. a foil). The supporting means may be optionally provided with suction holes for holding the image receiving member in a fixed position with respect to the supporting means. The embodiment shown in FIG. 1 comprises a X-Y table as a substrate supporting means 1. The X-Y table moves in both the X and Y direction, as indicated with double arrows X and Y respectively, in accordance with a predetermined desired pattern. In this embodiment, the ink jet printing assembly 3 comprises a first print head 4a and a second print head 4b. The print heads 4a, 4b (also referred to as print heads 4) are stationary print heads, i.e. the print heads 4 are rigidly fixed to their surroundings as indicated with 6. In an alternative embodiment, the ink jet printing assembly 3 comprises a stationary supporting means 1 and print heads 4 mounted on a carriage (not shown) scanning in both the X and Y direction. In yet another embodiment, a combination of an X-Y table and a scanning print head is foreseen. For example, a substrate supporting means stepwise moving in the X direction and a print head mounted on a carriage scanning in the Y direction. In yet another embodiment a fixed substrate wide array of print heads is used and the substrate moves in print direction without scanning. The print heads 4 comprise an orifice surface 9, as is shown in FIG. 1B. The orifice surface 9 is provided with at least one orifice 8. In the ink jet printing assembly 3, the orifice surface 9 faces towards the supporting means 1 and the substrate 2.

The first print head 4a is configured to eject droplets 7a of a building material onto the substrate 2, thereby forming a three dimensional object. The second print head 4b is configured to eject droplets 7b of a support material. The support material may form a support structure for stabilizing the 3D object during manufacturing. The substrate supporting means 1 and the carriage comprising the print head and the print head 4 are controlled by suitable controlling means 10.

Only two print heads 4 are depicted for demonstrating the invention. In practice an arbitrary number of print heads may be employed, in particular to provide redundancy for compensating failing nozzles.

The print head 4 comprises an orifice surface 9 having at least one orifice 8, in fluid communication with a pressure chamber containing fluid marking material provided in the print head 4. On the orifice surface 9, a number of orifices 8 is arranged in a linear array. Five orifices 8 are depicted in FIG. 1B, however obviously in a practical embodiment several hundreds or thousands of orifices 8 may be provided in a print head 4, optionally arranged in multiple arrays. The image dots are formed by ejecting droplets of marking material from the orifices 8.

Figure 2A:
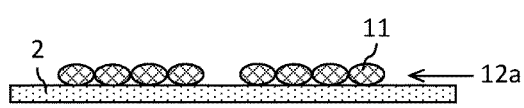
FIG. 2A-FIG. 2N show a first exemplary embodiment of a method for forming a 3D object.

In FIG. 2A, a cross section of substrate 2 is shown. The substrate 2 is provided with droplets 11 of the support material according to the present invention. The droplets 11 have been applied onto the substrate 2 in a predetermined pattern and form a first layer 12a of support material 11. The droplets have been applied onto the substrate 2 using an inkjet printing apparatus, for example an inkjet printing apparatus as shown in FIG. 1A. However, in an alternative embodiment, the support material may have been applied using different means.

Figure 2F:
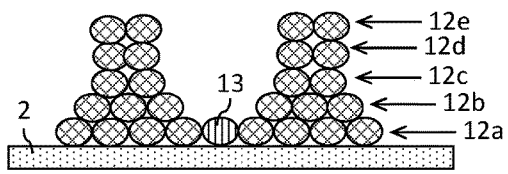
Figure 2B:
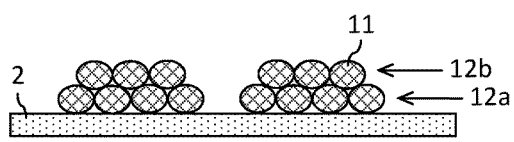

In FIG. 2B, a cross section of substrate 2 is shown, wherein the substrate is provided with a second layer 12b of the support material. The second layer 12b is positioned on top of the first layer 12a.

Figure 2G:
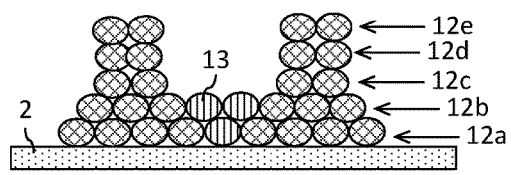
Figure 2C:
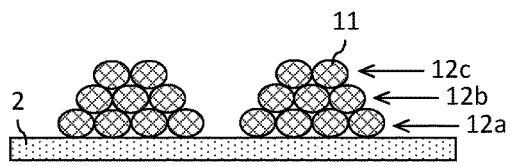

In FIG. 2C a cross section of substrate 2 is shown, wherein the substrate is provided with a third layer 12c of the support material. The third layer 12c is positioned on top of the second layer 12b.

Figure 2H:
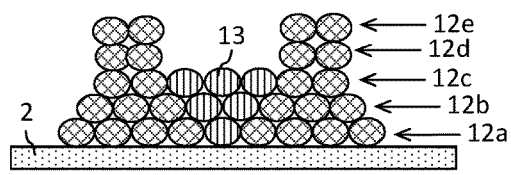
Figure 2D:
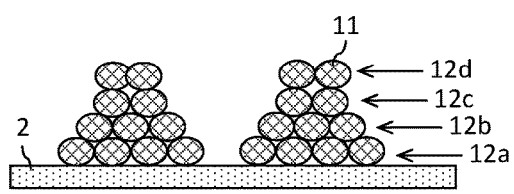

In FIG. 2D a cross section of substrate 2 is shown, wherein the substrate is provided with a fourth layer 12d of the support material. The fourth layer 12d is positioned on top of the third layer 12c.

Figure 2I:
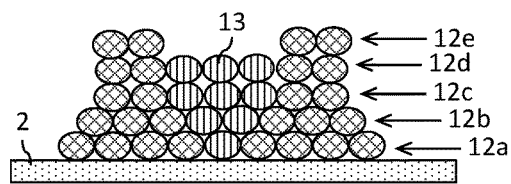
Figure 2E:
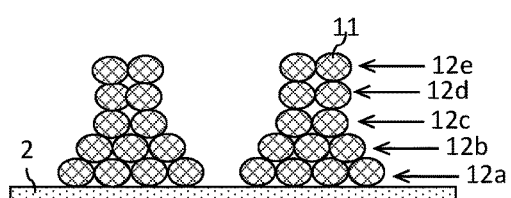

In FIG. 2E a cross section of substrate 2 is shown, wherein the substrate is provided with a fifth layer 12e of the support material. The fifth layer 12e is positioned on top of the fourth layer 12d. The first layer 12a—fifth layer 12e form a support structure (also referred to as support structure 12). Only five layers are shown in this example. However, in practice the support structure may be formed by a different number of layers. For example, tens or hundreds of layers may be applied to build the 3D support structure.

In a next step, the building material is deposited and the building of the actual 3D object is started.

In FIG. 2F, a cross section of substrate 2 is shown wherein the substrate is provided with the support structure 12. In addition, the substrate 2 is provided with a first layer of building material 13. The building material 13 is deposited in the gap formed by the first layer 12a of support material. The building material may be any suitable jettable material for forming a 3D object, such as a phase change ink or a radiation curable ink. Optionally, the building material may be a radiation curable phase change ink.

Figure 2J:
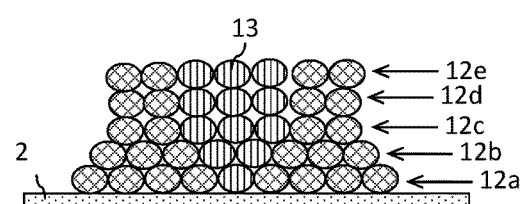

In FIG. 2G-FIG. 2J, it is schematically shown how the object gradually builds. In FIG. 2G, the substrate is provided with a second layer of building material 13, positioned on top of the first layer. In FIG. 2H, the substrate is provided with a third layer of building material 13, positioned on top of the second layer. In FIG. 2I, the substrate is provided with a fourth layer of building material 13, positioned on top of the third layer. In FIG. 2J, the substrate is provided with a fifth layer of building material 13, positioned on top of the fourth layer. The building material 13 is provided on the substrate 2 in a cavity formed by the support structure 12.

Figure 2K:
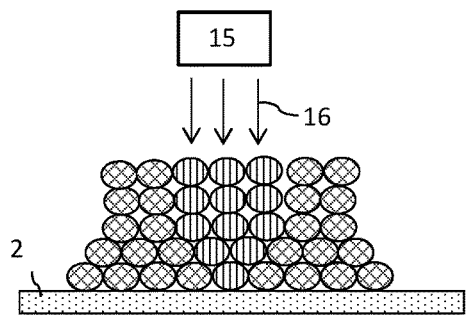

In FIG. 2K a cross section of substrate 2 is shown, wherein the substrate is provided with the support structure 12 and the building material 13. Above the substrate 2 provided with the support structure 12 and the building material a curing means 15 is provided. The curing means is configured to cure the building material 13. For example, in case the building material 13 is a radiation curable material, then the curing means 15 may be a radiation source configured to emit a suitable radiation for curing the building material, for example UV radiation. As shown in FIG. 2K, the curing means 15 emits rays of radiation 16. The rays of radiation cure the building material, thereby transforming the building material applied on the substrate in the actual 3D object. In this example, the entire 3D object is cured in one curing step. In an alternative embodiment, the 3D object may be cured in a number of curing step. For example, each layer of building material applied may be cured in between depositing that layer and deposited a subsequent layer.

Figure 2L:
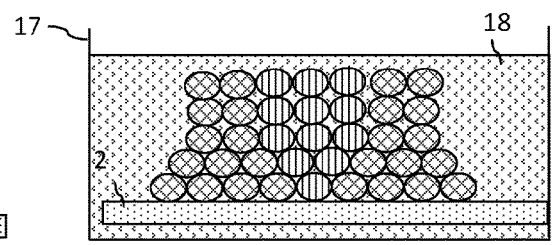
Figure 2M:
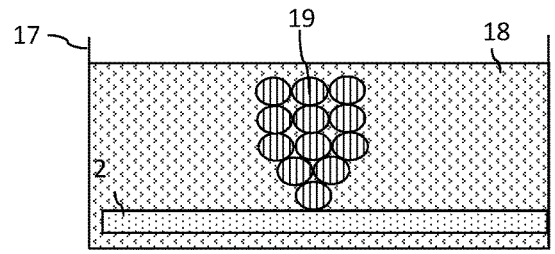

In FIG. 2L, a cross section of substrate 2 is shown, wherein the substrate is provided with the support structure 12 and the building material 13. The substrate provided with the support structure 12 and the building material 13 is submerged in a reservoir 17 filled with a medium 18 for removing the support structure. The medium 18 may be gaseous. Preferably, the medium 18 is a liquid, for example water. Optionally, the reservoir 17 comprising the medium 18 may be temperature controlled using a suitable heating/cooling system (not shown). Optionally, the reservoir 17 may be provided with stirring means (not shown) for stirring the medium 18 for removing the support structure. The temperature of the medium 18 may influence the speed of the removal of the support structure. The medium 18 for removing the support structure dissolves or disperses the support material. As a consequence, after a certain time interval, the support structure 12 may be removed from the substrate and may be dissolved/dispersed in the medium 18 for removing the support structure. This situation is schematically shown in FIG. 2M. The substrate 2 is still provided with the building material forming the 3D object 19. The substrate 2 is no longer provided with the support structure 12. After the support structure 12 has been removed, the substrate 2 provided with the 3D object may be removed from the reservoir 17 comprising the medium 18. Optionally, the substrate 2 provided with the 3D object may be cleaned and/or dried after removal from the reservoir 17.

Figure 2N:
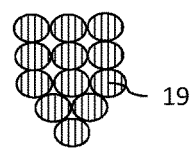

In FIG. 2N, a cross section of 3D object 19 is shown. The 3D object is no longer connected to the substrate 2. The 3D object 19 may be disconnected from the substrate 2 using suitable means. For example, the 3d object 19 may be cut from the substrate 2. The skilled person will be able to select a suitable method to remove the 3D object 19 from the substrate 2.

Figure 3A:
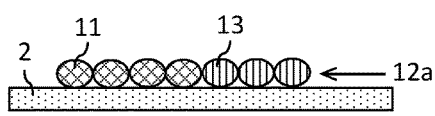
FIG. 3A-FIG. 3F show a second exemplary embodiment of a method for forming a 3D object.

In FIG. 3A, a cross section of substrate 2 is shown. The substrate 2 is provided with a first layer 12a of material. The first layer 12a comprises support material 11 as well as building material 13. The support material 11 and the building material may be provided to the substrate substantially at the same time. For example, a jetting device (not shown) comprising a first jetting unit for ejecting droplets of the support material 11 and a second jetting unit for jetting droplets of the building material 13 may be employed to provide the substrate 2 with support material 11 and building material 13. The first jetting unit and the second jetting unit may be e.g. print heads.

The support material 11 is applied to the substrate 2 in a predetermined pattern. The predetermined pattern is such that the support material 11 supports the building material 13 during the printing process. The building material 13 is also applied to the substrate 2 in a predetermined pattern. The predetermined pattern is such that the droplets and layers of the building material form a predetermined 3D shape after the printing process has been finished.

Figure 3B:
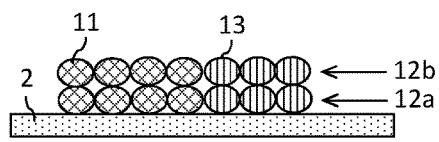

In FIG. 3B, a cross section of substrate 2 is shown. The substrate is provided with a second layer 12b of material. The second layer 12b comprises support material 11 as well as building material 13. The second layer 12b is positioned on top of the first layer 12a.

Figure 3C:
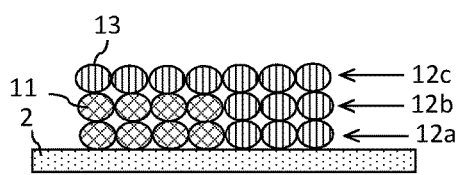

In FIG. 3C, a cross section of substrate 2 is shown. The substrate is provided with a third layer 12c. The third layer 12c comprises the building material 13; it does not comprise the support material 11. The third layer is provided on top of the second layer 12b. Part of the third layer is supported by the support material 11. The support structure enables manufacturing 3D objects having an irregular shape.

Figure 3D:
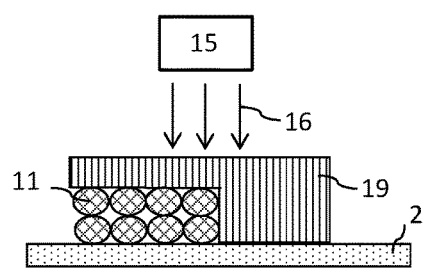

In FIG. 3D, a cross section of the substrate 2 provided with e.g. with the support material 11. Further, a curing means 15 is provided. The curing means 15 is a source of suitable radiation, for example UV radiation. The curing means 15 emits radiation 16 to the substrate 2 and the material provided thereon. Under influence of the radiation, the building material 13 (see FIG. 3C) may undergo a physical and/or chemical transformation. This process is referred to as curing. Hence, under influence of the radiation 16 emitted by the curing means 15, the building material is cured, thereby transforming the building material into 3D object 19.

Figure 3E:
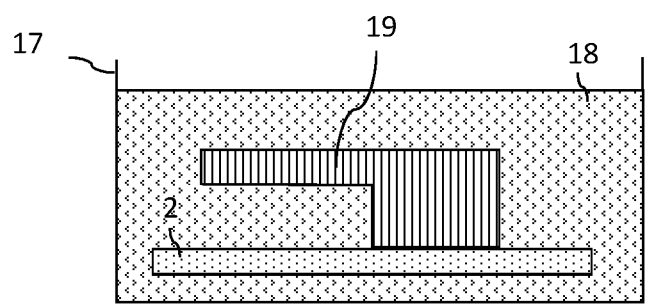
Figure 3F:
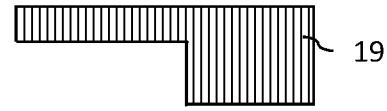

In FIG. 3E, a cross section of the substrate 19 is shown. The substrate 2 is provided with the 3D object 19. The substrate 2 provided with the 3D object 19 is submerged in a reservoir 17 comprising a medium 18 for removing the support structure. The support structure is no longer present in the situation shown in FIG. 3E, as is has been removed by the medium 18. After the support structure has been removed, the 3D object 19 may be removed from the substrate 2. In FIG. 3F, a cross section of the 3D object 19 is shown.

EXPERIMENTS AND EXAMPLES

Materials

Glutaric acid was obtained from VWR® International. IJ 255 inks were obtained from Canon.

All materials used in the examples are used as obtained from the supplier, unless otherwise stated.

Methods

Printing Method 3D prints were made using an Arizona 550 XT printer. One of the print heads present in the Arizona 550 XT printer was replaced by a print head obtained from an Océ Colorwave 600 printer. Glutaric acid was provided to the print head obtained from the Océ Colorwave 600 printer. In this print head, glutaric acid was kept at a temperature of 125° C. Glutaric acid was used as support structure. The other print heads were provided with IJC 255 ink. This ink was used as the building material. The printer was configured to deposit building material and support material in a same swath.

A bridge-shaped structure was printed. The bridge-shape comprised two pillars having a cuboid shape and dimension of 0.20×7×0.24 cm (l×b×h). The two pillars were printed with a distance of 7 cm in between. The bridge structure further comprises a flat upper part of 15×7×0.8 cm (l×b×h). Underneath the flat upper path, support material was provided to stabilize the bridge structure during the printing process.

Removal of Support Structure

The support structure was removed by submerging the print product in a reservoir comprising water. The water was kept at a temperature of about 45° C.

Example

A bridge structure as well as a support structure were printed using the IJC 255 UV ink (black) as building material and glutaric acid as support material.

After finishing the printing process, the support structure was removed according to the method described above. The support structure was removed completely, yielding a stable 3D object.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A method for forming a 3D object, the method comprising the steps of:
   selectively depositing layers of a building material by ejecting droplets of the building material;
   depositing a support structure by depositing droplets of a support material, wherein the support material comprises an organic di-acid having a molecular weight of 300 g/mole or less,
   wherein the support material comprises at least 85 wt % of the organic di-acid, based on the total amount of support material.

2. The method according to claim 1, wherein the method further comprises the step of:
   removing the support structure.

3. The method according to claim 2, wherein the support structure is removed using water.

4. The method according to claim 1, wherein the organic di-acid is glutaric acid.

5. A method for forming a 3D object, the method comprising the steps of:
   selectively depositing layers of a building material by ejecting droplets of the building material;
   depositing a support structure by depositing droplets of a support material, wherein the support material comprises an organic di-acid having a molecular weight of 300 g/mole or less,
   wherein the organic di-acid is glutaric acid.

6. The method according to claim 5, wherein the method further comprises the step of:
   removing the support structure.

7. The method according to claim 6, wherein the support structure is removed using water.

8. The method according to claim 5, wherein the support material comprises at least 85 wt % of the organic di-acid, based on the total amount of support material.

* * * * *